Figure 1:
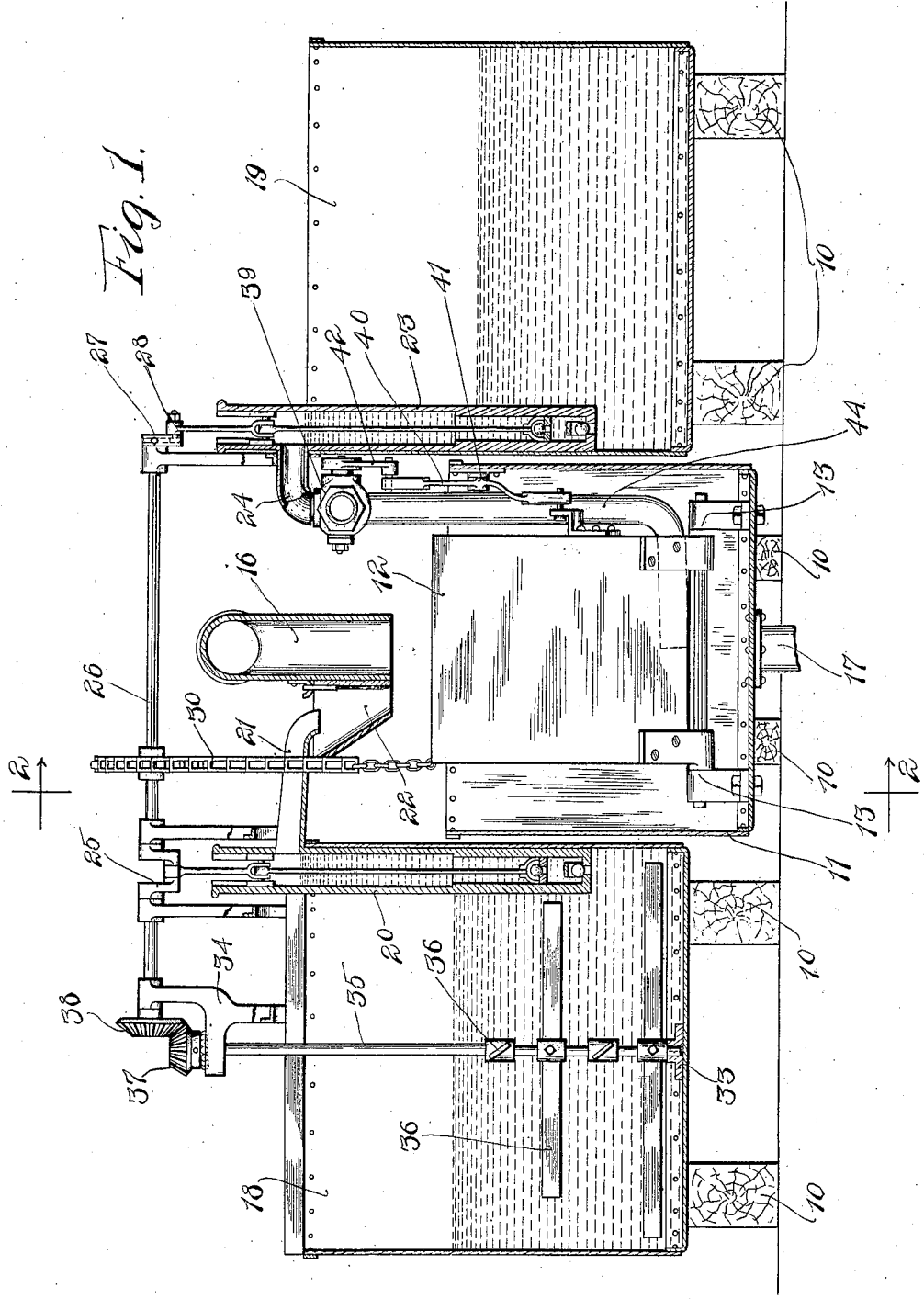

No. 831,247. PATENTED SEPT. 18, 1906.
R. C. SMITH.
MIXING AND MEASURING APPARATUS.
APPLICATION FILED MAY 16, 1906.

2 SHEETS—SHEET 1.

Witnesses:
Arthur H. Boettcher,
George C. Higham.

Inventor
Robert C. Smith
By Charles A. Brown
Attorney

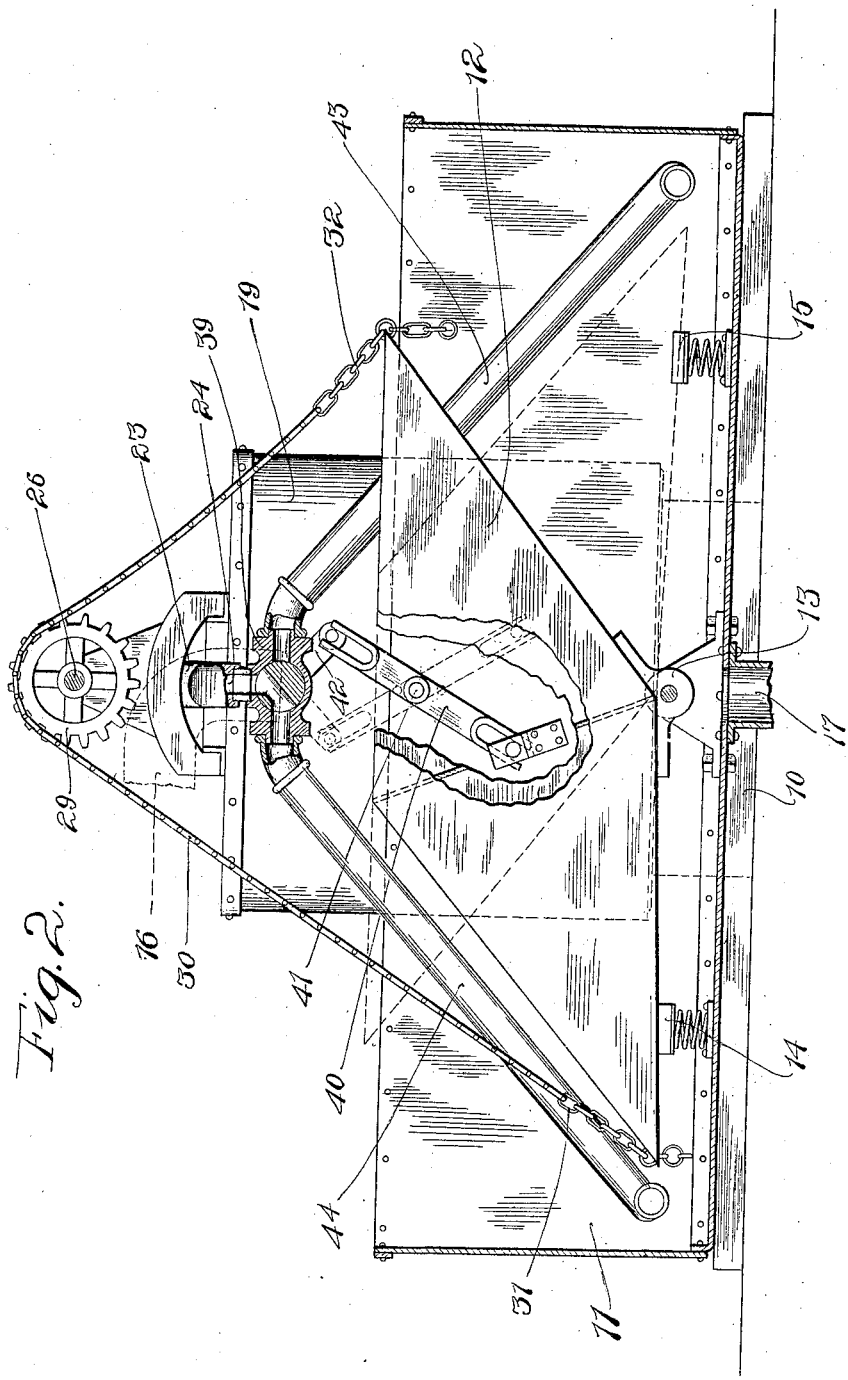

UNITED STATES PATENT OFFICE.

ROBERT C. SMITH, OF OAK PARK, ILLINOIS.

MIXING AND MEASURING APPARATUS.

No. 831,247.      Specification of Letters Patent.      Patented Sept. 18, 1906.

Application filed May 16, 1906. Serial No. 317,110.

*To all whom it may concern:*

Be it known that I, ROBERT C. SMITH, a citizen of the United States, residing at Oak Park, in the county of Cook and State of Illinois, have invented a certain new and useful Improvement in Mixing and Measuring Apparatus, of which the following is a full, clear, concise, and exact description, reference being had to the accompanying drawings, forming a part of this specification.

My invention relates to apparatus for mixing and combining fluids and is particularly adapted for use in the chemical treatment of water, as in processes of softening or purification.

In the chemical treatment of water to remove scale-forming matter it is very often desirable to treat the water by steps—that is, to add one chemical to the water and thoroughly mix the same, then subject this partially-treated water to another chemical treatment to remove other scale-forming or objectionable matter still in the water. For example, a water containing both the carbonates and sulfates of lime and magnesia can be treated first with lime to remove the carbonates of lime and magnesia, (soft incrustants,) and to the water freed of the carbonates of lime and magnesia soda-ash can be added to remove the sulfates of lime and magnesia (hard incrustants) and the same thoroughly agitated. By this method the highest economy in chemical treatment of water can be obtained, as direct chemical reactions take place. If lime and soda-ash are added simultaneously to the hard water under treatment, lime and soda-ash, having an affinity for each other, react to form caustic soda and carbonate of lime. Carbonate of lime is absolutely inert chemically and is just so much foreign matter added to the water. Caustic soda is the reacting element and undergoes chemical transformation. It will readily be seen that chemical energy is wasted, as indirect chemical reactions take place in removing the scale-forming matter from the water. Now if lime can be added directly to the water to combine with the carbonic oxid holding the carbonates of lime and magnesia in solution and the carbonates of lime and magnesia are therefore thrown out of solution the soda-ash can react directly on the sulfates of lime and magnesia and precipitate the lime and magnesia as insoluble carbonates.

In accordance with my invention the necessary chemicals are added to the water as it passes through the automatic measuring and mixing apparatus. In such a machine it is important that all the water of given character be treated with the same quantities of chemicals, and to accomplish this measured addition of suitable chemicals I provide a tilting vessel through which the raw water passes and which serves automatically to measure the water passing through the apparatus. The tilting vessel in turn controls the addition of the chemicals to maintain the proper proportion of admixture.

In accordance with my invention lime is added to and thoroughly mixed with the water in the tilting vessel and the carbonates of lime and magnesia are precipitated. This water having been freed from the carbonates of lime and magnesia is discharged from the tilting vessel and the soda-ash is added during this discharge to react on the sulfates of lime and magnesia to convert them into the carbonates of lime and magnesia, in which form they are precipitated. My invention provides mechanism for separately adding these chemicals and for rapidly and thoroughly mixing them in the water to be treated.

My invention will be readily understood by reference to the accompanying drawings, in which—

Figure 1 is a side elevation of the machine embodying my invention, certain parts being shown in cross-section in order to more clearly illustrate the interior construction; and Fig. 2 is a cross-sectional view taken on line 2 2 of Fig. 1, parts being broken away to illustrate the details of construction.

In both the figures like characters of reference apply to like parts.

The apparatus shown in the drawings is frequently mounted at the top of a settling tank or reservoir, and the beams 10 10 may be understood as resting upon the platform at the top of such a tank and supporting the apparatus of my invention. Two of the cross-beams support a discharge-vat 11, in which the tilting vessel 12 is mounted to swing upon the pivotal support 13, the motion of the tilting vessel being limited by the spring-stops 14 and 15. The raw water to be treated is delivered through the raw-water-inlet pipe 16, the center of which is placed directly above the center of the pivotal supports 13 13, as indicated by the dotted lines in Fig. 2. The pipe 17 conveys the treated water from the vat 11 to the settling-tank or in such other manner as may be desired. At either side of the vat 11 there is a chemical-supply tank, the mixture of lime and water being placed in the supply-tank 18. A single pump is placed in each of the chemical-supply tanks, the pump 20 serving to pump the mixture of lime and water from the tank 18 and delivering it to the tilting vessel through the spout 21 and the hopper 22. The pump 23 pumps a solution of soda-ash from the tank 19 and delivers it through the outlet 24 in a manner which will be more fully described. The pump-rod of the pump 20 is connected, as shown, with a crank 25, mounted upon a rock-shaft 26. This rock-shaft carries also a crank 27, having a T-slot, as indicated by dotted lines, whereby the position of the crank-pin 28 may be varied to regulate the length of the stroke of the pump-rod of the pump 23. By this means it is possible to vary the stroke of one pump relative to that of the other. The rock-shaft 26 is operated by means of a sprocket-wheel 29 and a sprocket-chain 30 engaging the teeth of the sprocket-wheel and connected at either end by the link chains 31 and 32 with the ends of the tilting vessel 12. It is to be noted that, as shown in the drawings, the chain for operating the rock-shaft is slack and the amount of slack in the chain can be regulated at the points of attachment to the tilting vessel. Suitable bearings 33 and 34 carry a shaft 35, on which the stirring paddles or blades 36 36 are mounted. The bevel-gears 37 and 38 cause a rotation of the stirring-blades whenever the rock-shaft is rotated.

The operation of this embodiment of my invention may be described as follows: Assuming the tilting vessel to be in position shown in Fig. 2, raw water runs from the inlet-pipe 16 into the upper hopper of the tilting vessel, filling this hopper to such an extent that the center of gravity of the tilting vessel is shifted to the right of the pivotal support, whereupon the tilting vessel oscillates toward the right with a consequent discharge of the water from the tilting vessel into the vat 11. This movement of the tilting vessel will cause a clockwise rotation of the rock-shaft 26, this causing in turn an up and a down stroke of both of the pumps. The up-stroke of the pump 23 will discharge a quantity of the soda-ash solution through the outlet-pipe 24 to the three-way controlling-valve 39. The movement of the tilting vessel actuates the reversing-lever 40, whose fulcrum is pivoted to the side of the vat at 41, and the forked end of this reversing-lever engaging the crank-arm 42 will shift the controlling-valve 39 so that the soda-ash delivered from the outlet-pipe 24 will pass through the three-way valve to the delivery-tube 43, this delivery-tube leading from the controlling-valve to a point in the vat 11 just opposite the place at which the water is discharged from the right-hand compartment of the tilting vessel, this position of the tilting vessel being indicated in the dotted lines of Fig. 2. The water discharging from this right-hand compartment of the tilting vessel mixes with the soda-ash solution delivered by the tube 43, and the rush of water thoroughly and rapidly mixes the soda-ash solution throughout the volume of the water. The discharge of the hopperful of water causes a considerable agitation within the vat 11, so that by the time the water leaves the vat 11 by way of the pipe 17 the mixture of the soda-ash solution with the water which is to be treated is quite thorough. This same movement of the tilting vessel to the right causes also an up and a down stroke of the pump 20, the mixture of lime and water discharged from the spout 21 entering the left-hand compartment of the tilting vessel, which then assumes the upper position directly beneath the spout 21 and the raw-water-inlet pipe 16. The raw water discharging into the left-hand hopper causes a thorough agitation of the water in the hopper, thereby mixing it thoroughly with the lime discharged from the spout 21. When the left-hand compartment of the tilting vessel is filled, (the right-hand compartment having discharged itself,) the vessel will oscillate back into the position shown in the full lines in Fig. 2. The treatment within the hoppers of the tilting vessel removes the carbonates of lime and magnesia, as I have already described, and the water discharged from the left-hand compartment being freed from these carbonates is mixed with a solution of soda-ash supplied from the delivery-tube 44 due to the shifting of the three-way valve 39. The movement of the tilting vessel toward the left actuates the reversing mechanism to close communication between the outlet-pipe 24 and the tube 43 and to open communication by way of the delivery-tube 44, as shown in the full lines of Fig. 2. The actuation of the pumps takes place as before, causing the soda-ash solution to be delivered by the pump 23 and the line mixture to be delivered by the pump 20 to the right-hand hopper of the tilting vessel, which now again assumes the upper position shown in the full lines of Fig. 2. The raw water discharging into the right-hand compartment is of course mixed with its quota of lime mixture while subjected to violent agitation in the hopper of the tilting vessel, and upon its discharge from this hopper the admixture of the soda-ash solution takes place, as before. This cycle of operations is repeated indefinitely, serving at all times to thoroughly mix with each hopperful of water a given quantity of the lime mixture and subsequently with a given quantity of soda-ash solution.

The chemical characteristics of the water to be treated—i. e., the amount and character of the impurities—determines the amount of each of the chemicals which must be added to each hopperful of water in order that complete treatment may take place, but without waste of materials. By varying the strength of the solutions or mixtures in the supply-tanks the proportions of the chemicals may be varied to meet the requirements of the water to be treated; but my invention provides means also whereby any raw water may be treated with a given mixture of lime and water and with a given solution of soda-ash. This can be accomplished on account of adjustments with which my apparatus is provided. The amount of lime mixture delivered by the pump 20 is controlled by the length of the chains 31 and 32 and may be varied as desired. The adjustment of this pump having been accomplished to add the proper amount of lime mixture, the length of the stroke of the pump may be varied by shifting the position of the crank-pin 28 in the slot of the crank 27, whereby the addition of the correct amount of soda-ash may be obtained. No matter what the adjustments of these pumps may be the length of the cranks on the rock-shaft 26 determines the stroke of the pumps. These pumps, therefore, are positive in their action and serve accurately to measure the quantities of chemicals added to each hopperful of water passing through the tilting vessel. Not only are the pumps positive in their action, but since each pump has a complete upstroke and a complete downstroke with each movement of the tilting vessel a flow of the chemicals through the pumps is sufficiently rapid to prevent sedimentation to injuriously affect the proper operation of the pump-valves.

While I have herein shown and described a preferred embodiment of my invention, many modifications will occur to those skilled in the art, and I do not, therefore, enter into a detailed description of them. The scope of my invention is not to be limited, however, to the details of the apparatus herein set forth; but, Having described my invention, I claim as new and desire to secure by Letters Patent—

1. In a device of the class described, the combination with a tilting vessel, of a raw-water-inlet pipe discharging alternately into the two compartments of said tilting vessel to actuate said vessel, a pump operated by the movements of the tilting vessel and discharging into said tilting vessel, and a second pump operated by the movements of the tilting vessel and discharging into the fluid during its delivery from the tilting vessel.

2. In a device of the class described, the combination with a discharge-vat, of a tilting vessel pivotally mounted therein, a raw-water-inlet pipe discharging alternately into the two compartments of the tilting vessel to cause an oscillation thereof, a lime-tank, a pump to pump liquid from said lime-tank and to discharge it into said tilting vessel, mechanism connecting said tilting vessel with said pump and serving to cause an up and a down stroke of said pump with each movement of the tilting vessel, a soda-ash tank, a second pump pumping liquid from the soda-ash tank, mechanism connecting said pump with the tilting vessel and causing an up and a down stroke of said pump for each movement of the tilting vessel, two discharge-tubes, one leading from the second pump to a point adjacent to the place of discharge from one compartment of the tilting vessel and the other leading from said pump to a point adjacent to the place of discharge from the other compartment of the tilting vessel, and valve mechanism controlled by the tilting vessel for alternately opening a passage-way through one tube and closing the passage-way through the other with each movement of the tilting vessel.

3. In a device of the class described, the combination with a tilting vessel through which the water under treatment is passed, of means controlled by the movements of the tilting vessel to discharge one chemical into the tilting vessel, and means controlled by the movements of the tilting vessel to discharge another chemical into the fluid upon its delivery from the tilting vessel.

4. In a device of the class described, the combination with a chemical-supply tank, of a tilting vessel, a raw-water-inlet pipe discharging alternately into the two compartments of said tilting vessel, and a measuring-pump for pumping chemical fluid from said supply-tank and delivering the chemical to the place of delivery from said tilting vessel.

5. In a device of the class described, the combination with a chemical-supply tank, of a tilting vessel, a raw-water-inlet pipe discharging alternately into the two compartments of said tilting vessel, a measuring-pump for pumping chemical fluid from said supply-tank and delivering the chemical to the place of delivery from said tilting vessel, and mechanism connecting said tilting vessel with said pump to cause a complete up-and-down stroke of said pump in unison with each single oscillation of said tilting vessel.

6. In a device of the class described, the combination with a tilting vessel having two compartments, of a raw-water-inlet pipe discharging into the two compartments of said tilting vessel alternately, a lime-tank, a measuring-pump for pumping fluid from said lime-tank and delivering it to said tilting vessel, a rock-shaft, a crank on said rock-shaft connected with the pump-rod of said pump, gearing connecting the tilting vessel mechanically with said rock-shaft, the ratio and adjustment of said gearing being such as to cause an upstroke of said pump-rod in unison with each single oscillation of the tilting vessel, a soda-ash tank, a measuring-pump for pumping fluid from said soda-ash tank and delivering it to a point adjacent to the place of discharge from said tilting vessel, and a second crank on said rock-shaft connected with the pump-rod of the second pump.

7. In a device of the class described, the combination with a tilting vessel having two compartments, of a raw-water-inlet pipe discharging into the two compartments of said tilting vessel alternately, a lime-tank, a measuring-pump for pumping fluid from said lime-tank and delivering it to said tilting vessel, a rock-shaft, a crank on said rock-shaft connected with the pump-rod of said pump, gearing connecting the tilting vessel mechanically with said rock-shaft, the ratio and adjustment of said gearing being such as to cause an upstroke of said pump-rod in unison with each single oscillation of the tilting vessel, a soda-ash tank, a measuring-pump for pumping fluid from said soda-ash tank and delivering it to a point adjacent to the place of discharge from said tilting vessel, a second crank on said rock-shaft connected with the pump-rod of the second pump, and means for adjusting the stroke of the second pump independently of that of the first of said pumps.

8. In a device of the class described, the combination with a discharge-vat, of a tilting vessel pivotally mounted therein, a chemical-supply tank, a pump for pumping fluid from said tank and delivering it directly into said discharge-vat, and mechanism connecting said tilting vessel with said pump, the ratio of gearing being such as to cause an upstroke of said pump in unison with each single oscillation of said tilting vessel.

9. In a device of the class described, the combination with a tilting vessel, of a raw-water-inlet pipe discharging into said tilting vessel, a source of chemical supply, and means controlled by the movements of said tilting vessel to deliver a predetermined quantity of the chemical to a point adjacent to the place of discharge from the tilting vessel whereby the quantity of chemical is determined by the movements of the tilting vessel.

10. In a device of the class described, the combination with a tilting vessel, of a raw-water-inlet pipe discharging into said tilting vessel, mechanism controlled by the movements of the tilting vessel for supplying one chemical to the raw water before it leaves the tilting vessel, and mechanism controlled by the movements of the tilting vessel for supplying another chemical to the water after it leaves the tilting vessel.

11. In a device of the class described, the combination with a tilting vessel, means for supplying raw water to said tilting vessel, a rock-shaft geared to said tilting vessel, two chemical-supply tanks, a pump for each chemical-supply tank, the pump-rods of said pumps being actuated by suitable cranks on said rock-shaft, and means for adjusting the length of one of said crank-arms.

12. In a device of the class described, the combination with a tilting vessel, means for supplying raw water to said tilting vessel, a rock-shaft geared to said tilting vessel, two chemical-supply tanks, a pump for each chemical-supply tank, the pump-rods of said pumps being actuated by suitable cranks on said rock-shaft, and means for adjusting the ratio of the strokes of said pumps.

13. In a device of the class described, the combination with a tilting vessel, of a raw-water-inlet pipe discharging into said tilting vessel, a chemical-supply tank, a pump associated with said chemical-supply tank, mechanism connecting said tilting vessel with said pump whereby actuation of the pump is controlled by the movements of the tilting vessel, a delivery-tube leading from said pump to each of the places of discharge from said tilting vessel, and valve mechanism controlled by the tilting vessel for alternately opening and closing the passage-way through each of said delivery-tubes.

14. In a device of the class described, the combination with a discharge-vat, of a pivotally-mounted tilting vessel in said vat, a raw-water-inlet pipe discharging alternately into the two compartments of said tilting vessel, a rock-shaft, mechanism connecting said tilting vessel with said rock-shaft, a lime-tank, a pump associated with the lime-tank, a crank on the rock-shaft for actuating said pump, stirring mechanism in the lime-tank geared to the rock-shaft, a soda-ash tank, a soda-ash pump, an adjustable crank on said rock-shaft for actuating the soda-ash pump, two delivery-tubes leading from said soda-ash pump, one to each of the places of discharge from the tilting vessel, means for adjusting the degree of rotation of the rock-shaft relative to that of the tilting vessel, and valve mechanism controlled by the movements of the tilting vessel for alternately closing the passage-way through one delivery-tube and opening that through the other delivery-tube in unison with each movement of the tilting vessel.

15. In a device of the class described, the combination with a tilting vessel having two compartments, of a raw-water-inlet pipe discharging into the two compartments of said tilting vessel alternately, a tank for chemical fluid, a measuring-pump for pumping chemical fluid from said tank and delivering it to said tilting vessel, a rock-shaft, a crank on said rock-shaft connected with the pump-rod of said pump, gearing connecting said tilting vessel mechanically with said rock-shaft, the ratio and adjustment of said gearing being such as to cause an upward stroke of said pump-rod in unison with each single oscillation of said tilting vessel, means for adjusting the ratio of gearing between said tilting vessel and said pump-rod, a second source of chemical supply, and means controlled by the movements of said tilting vessel for delivering a predetermined quantity of chemical from said second source of supply to the places of discharge from the tilting vessel.

In witness whereof I hereunto subscribe my name this 14th day of May, A. D. 1906.

ROBERT C. SMITH.

Witnesses:
    LEONARD W. NOVANDER,
    ARTHUR H. BOETTCHER.